United States Patent [19]

Wilcox, Jr.

[11] 4,418,933
[45] Dec. 6, 1983

[54] TRANSPORT FOR TRANSVERSE FARM EQUIPMENT HEAD

[76] Inventor: James D. Wilcox, Jr., Rte. #1, Cleghorn, Iowa 51014

[21] Appl. No.: 284,109

[22] Filed: Jul. 16, 1981

[51] Int. Cl.³ .............................................. B62D 21/12
[52] U.S. Cl. ................................. 280/400; 280/415 R
[58] Field of Search ............... 280/415 R, 400, 47.13, 280/408, 491 E, 404

[56] References Cited

U.S. PATENT DOCUMENTS

| | | | |
|---|---|---|---|
| 3,245,695 | 4/1966 | Bernard | 280/400 |
| 3,413,014 | 11/1968 | Franz | 280/400 |
| 3,503,620 | 3/1970 | Koskovich et al. | 180/182 |
| 3,515,408 | 6/1970 | Cagle | 280/415 R |
| 3,608,753 | 9/1971 | Scott | 414/345 |
| 3,721,461 | 3/1973 | Nelsen et al. | 280/415 R |
| 3,910,605 | 10/1975 | Danford | 280/415 R |

Primary Examiner—John A. Pekar
Assistant Examiner—D. Lynn Fugate
Attorney, Agent, or Firm—Harvey B. Jacobson

[57] ABSTRACT

A wheeled undercarriage for lengthwise trailering a removable elongated machine head is provided. The undercarriage includes first, second and third components and the first component includes structure for semi-permanent mounting of the first component from the head generally centrally intermediate the opposite ends thereof, but spaced longitudinally along the head from its point of longitudinal center of gravity. The first component includes lower right and left mount portions and the second and third components comprise right and left axle assemblies each including a mounting end and a wheel journaling end. The right and left mount portions and the mounting ends of the right and left axle assemblies include coacting structure for releasably supporting the right and left axle assembly mounting ends from the right and left mount portions, respectively. The wheel journaling ends of the axle assemblies are horizontally disposed, extend in parallel opposite directions and have support wheels journaled thereon. A removable tongue assembly is also provided for use in conjunction with the wheeled undercarriage and includes structure for removable attachment to one end of the associated elongated head.

5 Claims, 6 Drawing Figures

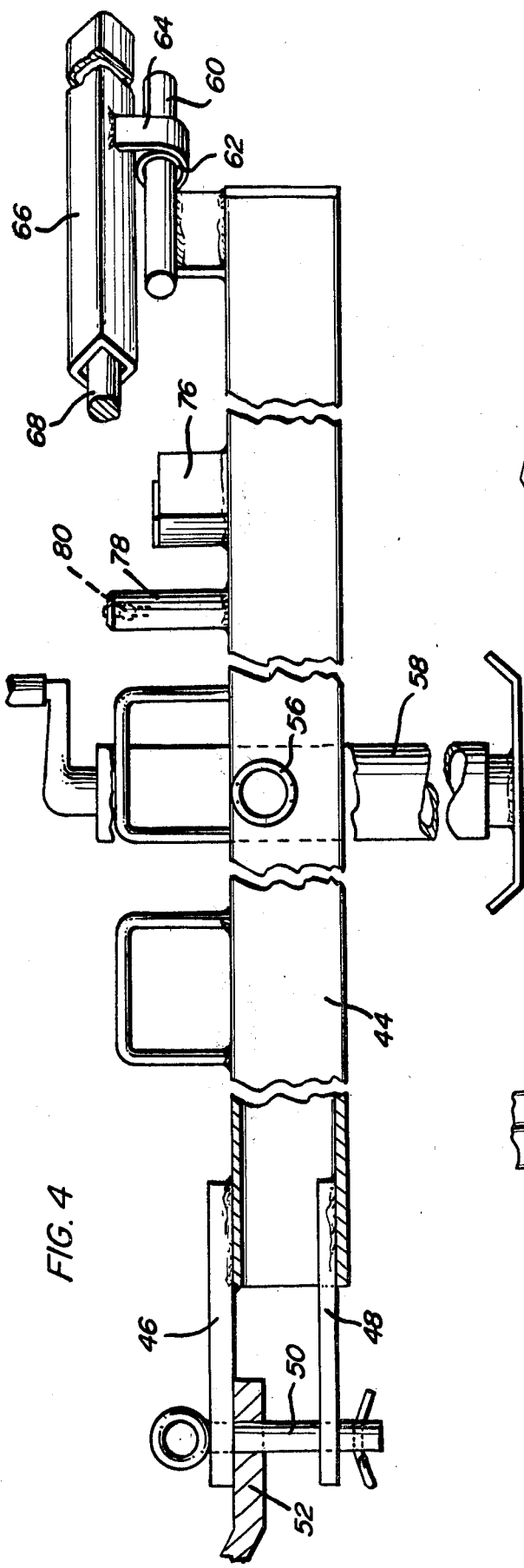
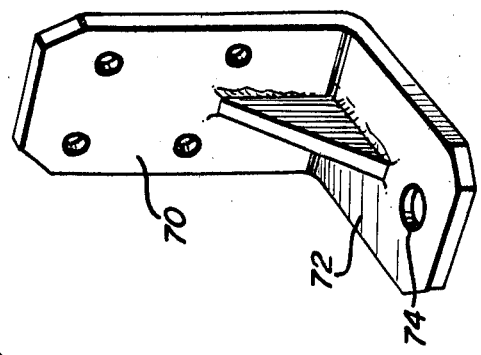
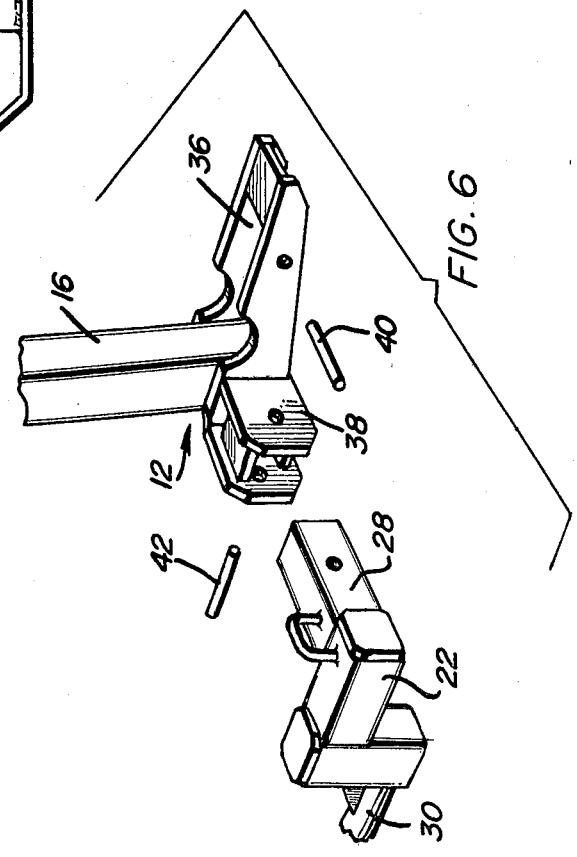

4,418,933

TRANSPORT FOR TRANSVERSE FARM EQUIPMENT HEAD

BACKGROUND OF THE INVENTION

Farm equipment heads of various types are horizontally elongated and are designed to be advanced transversely when supported from an associated prime mover. However, although the associated prime mover alone may be sufficiently narrow to be movable over country and state roads, a transversely disposed elongated head provided on such a prime mover is normally too wide to be allowed to be moved over country and state roads. Accordingly, a need exists for some method of transporting not only the prime mover, but also the associated elongated transverse head thereof.

While these elongated transverse heads are removable and various forms of full trailer assemblies heretofore have been provided for transporting these heads with the latter extending longitudinally of the supporting trailers, such full trailers are expensive to manufacture and are less controllable than a semi-trailer during trailering operations. Therefore, an improved manner of supporting an elongated transverse farm equipment head in the manner of a semi-trailer rather than a full trailer during transport from one location to another is needed.

Examples of previously known forms of trailable farm equipment are disclosed in U.S. Pat. Nos. 3,245,695, 3,515,408, 3,608,753 and 3,910,605.

BRIEF DESCRIPTION OF THE INVENTION

The transport of the instant invention includes first, second and third components with the first component being adapted for semi-permanent support from the longitudinal midportion of an elongated transverse farm equipment head and with the first component spaced slightly toward one end of the head from the longitudinal center of gravity of the head. The first component includes lower right and left mount portions and the second and third components of the transport comprise right and left axle assemblies each including a mounting end and wheel journaling end. The right and left mounting portions and the mounting ends of the right and left axle assemblies include coacting structure for releasably supporting the right and left axle assembly mounting ends from the right and left mount portions, respectively, of the first component. The wheel journaling ends of the right and left axle assemblies are disposed horizontal, extend in generally parallel opposite directions and have ground support wheel journaled therefrom. In addition, the transport includes a tongue assembly for removable support from the previously mentioned one end of the associated elongated equipment head whereby the latter may be readily trailed behind a suitable prime mover.

The main object of this invention is to provide a wheeled undercarriage for lengthwise trailering an elongated transverse farm equipment head with the elongated head disposed longitudinally relative to the direction of trailering movement thereof when equipped with the wheeled undercarriage.

Another object of this invention is to provide a wheeled undercarriage assembly which may be readily utilized on different forms of elongated transverse farm equipment heads.

Yet another object of this invention is to provide a wheeled undercarriage including mounting portions therefor which may be semi-permanently attached to an associated farm equipment head.

A further object of this invention is to provide a wheeled undercarriage assembly which may be slightly modified, when necessary, in order to adapt the undercarriage for use in conjunction with basically differently constructed farm equipment heads.

A final object of this invention to be specifically enumerated herein is to provide a wheeled undercarriage in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged fragmentary elevational view of the towing tongue portion of the instant invention;

FIG. 5 is an enlarged perspective view of a portion of the towing tongue mounting structure which is to be semi-permanently attached to the associated equipment head; and FIG. 6 is a fragmentary exploded perspective view of the wheeled undercarriage poriton of the instant invention.

DETAILED DESCRIPTION OF THE INVENTION

Figure 1:
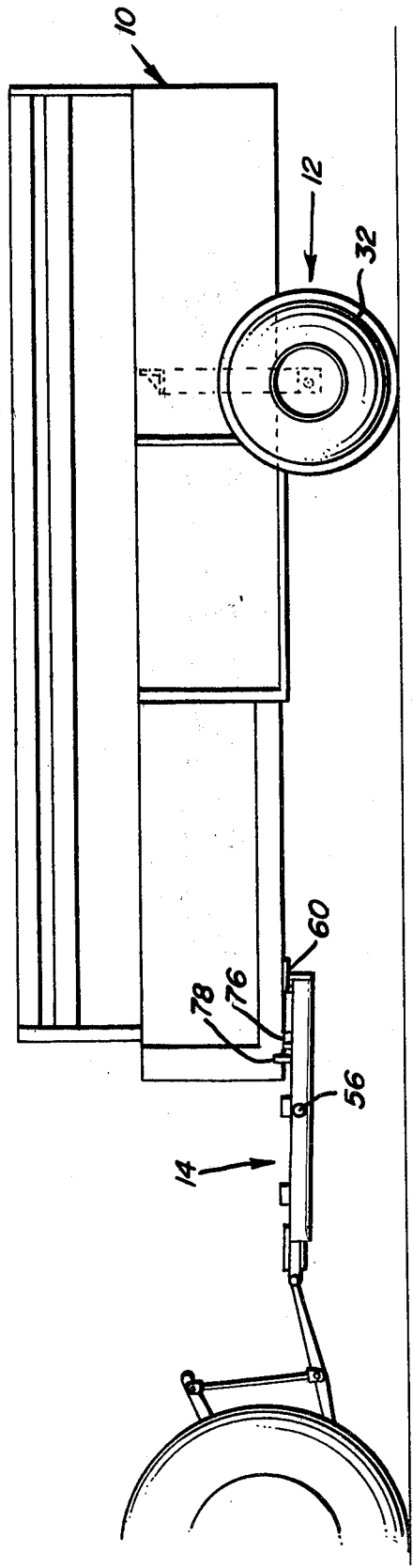
FIG. 1 is a side elevational view of an elongated farm equipment head with the undercarriage assembly of the instant invention operatively associated therewith and the elongated head being trailed behind a farm tractor.
Figure 2:
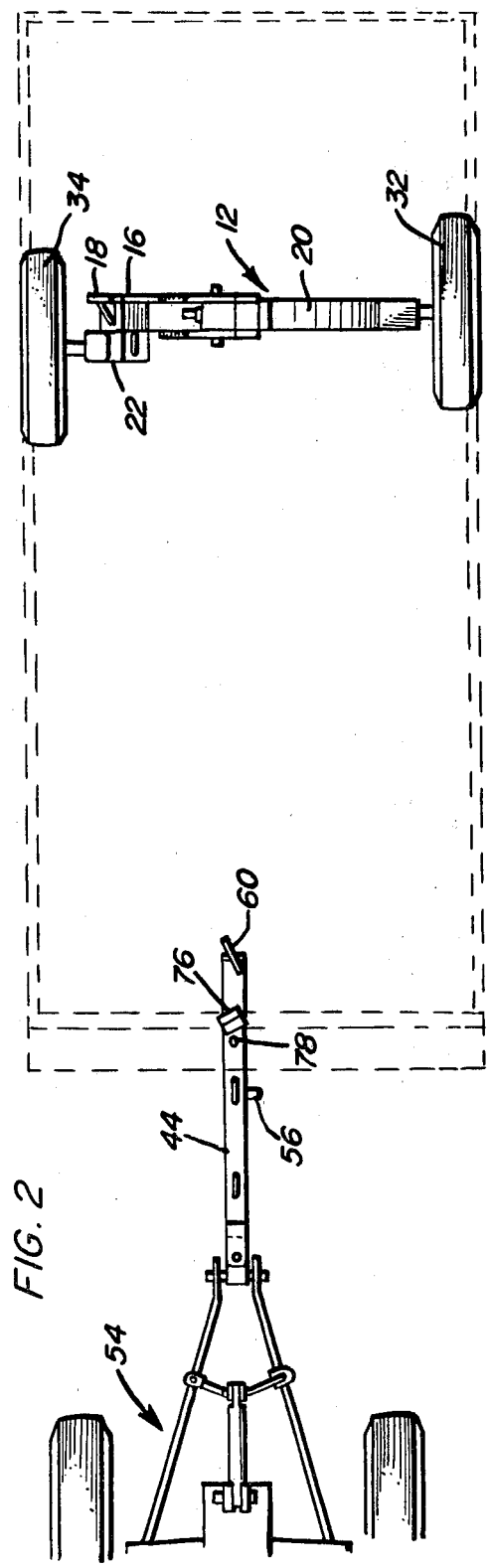
FIG. 2 is a top plan view of the assemblage illustrated in FIG. 1 and withthe farm equipment head illustrated in phantom lines.

Referring now more specifically to the drawings, the numeral 10 generally designates a horizontally elongated transverse farm equipment head. The head 10 is usually supported from and disposed transverse to a supportive prime mover for powering the working components of the head and the length of the head is so great as to prevent the prime mover, with the head attached, from being transported on county and state roads. Accordingly, inasmuch as the head is removable from the prime mover, the head may be transported in longitudinal position on either the bed of a truck or a four-wheel trailer. However, loading the head on a flat bed truck and subsequently unloading the head therefrom or utilizing a four-wheel trailer to trail the head requires considerable time to effect the loading and unloading operation and also requires the use of another vehicle and an operator therefor.

The transport of the instant invention is in the form of an undercarriage assembly referred to in general by the reference numeral 12 and a towing tongue assembly referred to in general by the reference numeral 14. The undercarriage assembly 12 includes a first upstanding mount component 16 designed for semi-permanent attachment to the head 10 at a point spaced slightly rearward of the longitudinal center of gravity thereof through the utilization of fasteners (not shown) secured through a mounting bracket 18 carried by the first component 16.

The undercarriage assembly 12 further includes second and third right and left axle components referred to in general by the reference numerals 20 and 22and the axle assembly 20 includes a mounting portion end 24 and a wheel journaling end 26, while the axle assembly 22 includes a mounting portion end 28 and a wheel journaling end 30. Right and left wheels 32 and 34 are journaled from the wheel journaling ends 26 and 30, respectively.

Figure 3:
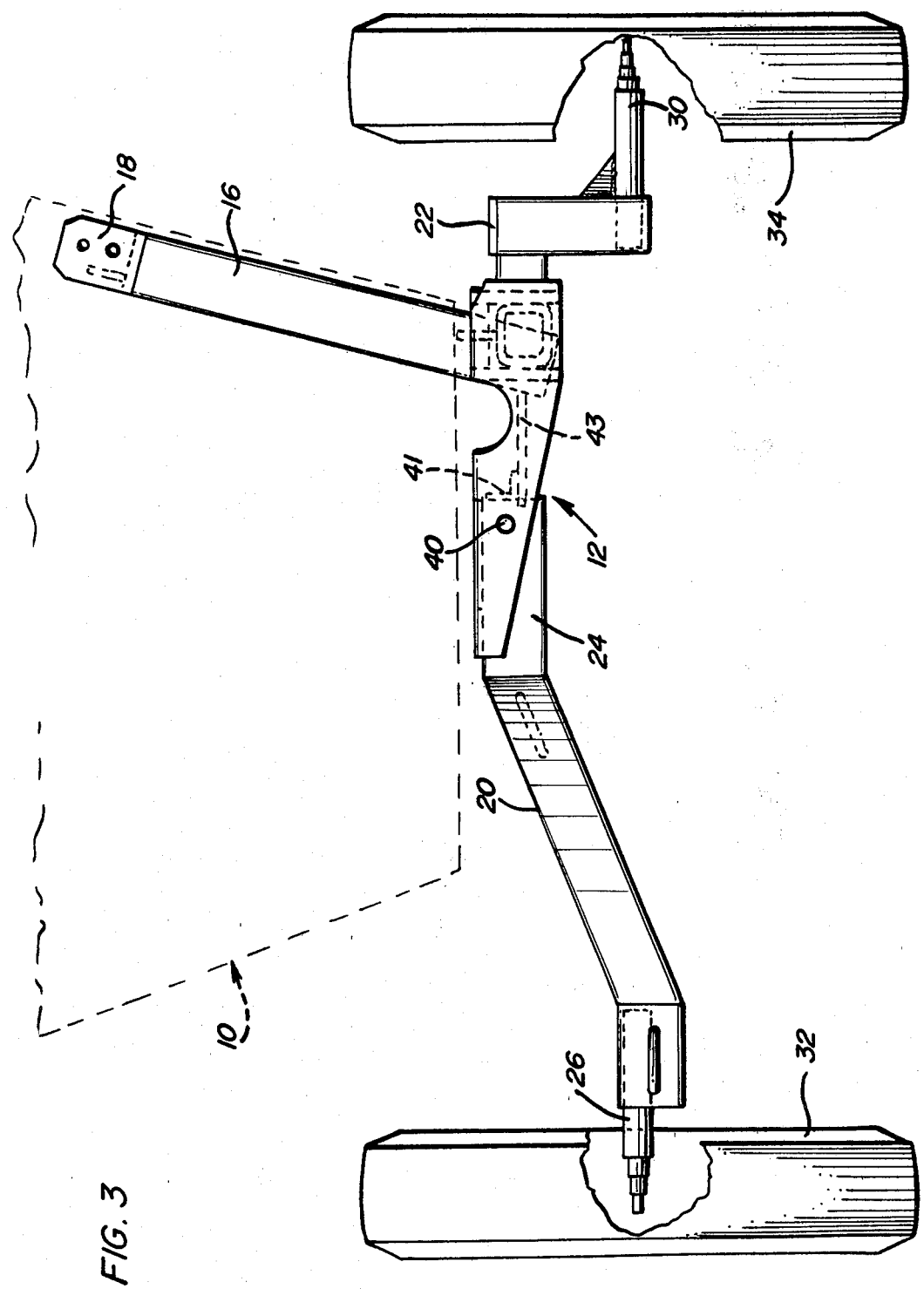
FIG. 3 is an enlarged rear elevational view of the wheel undercarriage.

The lower end of the first component 16 includes horizontally outwardly opening right and left socket defining mount portions 36 and 38 and the mounting ends 24 and 28 are removably telescopingly receivable within the mount portions 36 and 38 and releasably securable therein through the utilization of removable pins 40 and 42. The sockets defined by the mount portions 36 and 38 are substantially rectangular in cross section and the mounting portion ends 24 and 28 are also rectangular in cross section, the end 24 including an L-chaped transverse bracket 41 which laps over a transverse horizontal flange 43 carried by the mount portion 36, See FIG. 3.

The tongue assembly 14 comprises an elongated tubular tow bar 44 having vertically spaced forwardly projecting upper and lower flanges 46 and 48 carried by its forward end, the flanges 46 and 48 being provided with aligned vertical apertures for receiving a hitching pin 50 therethrough which also passes through a rearwardly projecting a vertically apertured tow bar 52 carried by the towing vehicle referred to in general by the reference numeral 54.

The tow bar 44 includes, centrally intermediate its opposite ends, a laterally outwardly projecting mounting tube 56 upon which the body portion of a suitable jack assembly 58 may be mounted for selective angular positioning between a vertical position and a horizontal position. Also, the rear end of the tow bar 44 includes an angulated horizontal attaching pin 60 which is removably telescopingly received through a support sleeve 62 carried by a U-shaped bracket 64 dependingly supported from a square tubular support arm 66. The opposite ends of the support arm 66 have front and rear hinge pins 68 telescoped thereinto, the hinge pins 68 comprising portions of the head 10.

The forward end of the head 10 has an L-shaped bracket 70 semi-permanently mounted thereon and the bracket 70 includes a horizontal flange 72 having a vertical bore 74 formed therethrough. The underside of the horizontal flange 72 of the bracket 70 downwardly abuts the upper end of a short vertically disposed rectangular tube 76 supported from the tow bar 44 intermediate the pin 60 and the jack assembly 58 and an upstanding hitch pin 78 supported from the tow bar 44 forward of the tube 76 is received upwardly through the bore 74 and removably secured therethrough by means of a suitable retaining pin 80.

Accordingly, when it is desired to attach the tow bar 44 to the front end of the head 10, it is merely necessary to position the tow bar 44 in a generally horizontally disposed position and to rearwardly insert the free rear end of the attaching pin 60 through the sleeve 62 to the position thereof illustrated in FIG. 4 of the drawings. Thereafter, the forward end of the tow bar 44 is slightly elevated to upwardly displace the upper end of the pin 78 through the bore 74 and the pin 80 is thereafter inserted through the pin 78 in order to retain the horizontal flange 72 of the bracket 70 on the pin 78.

When it is desired to attach the undercarriage 12 to the head 10, the head 10 is raised by means of the hydraulic lifting mechanism (not shown) provided therefor on the associated prime mover. Thereafter, the second and third components 20 and 22 may be telescopingly engaged with and secured in position supported from the first component mount portions 36 and 38 through the utilization of the pins 40 and 42. Then, the tow bar 55 may be installed and the jack assembly 58 may have the lower end thereof adjusted downwardly. Thereafter, the head 10 is lowered relative to the supporting prime mover until the wheels 32 and 34 and the jack 58 engage the ground. Thereafter, the structure supporting the head from the associated prime mover may be released and the forward end of the tow bar 44 may be attached to the tow bar 52 by the pin 50. The jack assembly 58 is then retracted and the head 10 may then be trailed behind the vehicle 54 while the corresponding prime mover travels under its own power, minus the head pin. Alternately, the prime mover 10 may be mounted upon a suitable low boy trailer or other vehicle load bed for more rapid transport.

Of course, when it is desired to reattach the head 10 to the associated prime mover, the head 10 is supported stationarily by the undercarriage assembly 12 and jack 58 of the tongue assembly 14 and the necessary connections between the head and the associated prime mover are reinstalled. Then, the second and third components 20 and 22 of the undercarriage assembly 12 and the towing tongue assembly 14 may be removed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a horizontally elongated farm equipment head adapted to be transversely advanced and having first and second ends and front and rear sides, a mount component semi-permanently supported from said head adjacent but spaced from one end of said head toward the other end thereof and including a first upstanding portion extending upwardly along said rear side and a second elongated horizontal portion including opposite ends, said second portion being carried by the lower end of said first portion with one end of said second portion disposed adjacent the lower end of said first portion and the other end of said second portion projecting transversely beneath said head toward the front side thereof, a pair of right and left elongated axle assemblies each including a mounting end and a wheel journalling end, the opposite ends of said second elongated horizontal portion defining right and left mount portion, said mount portions ans said mounting ends including coacting means releasably supporting said mounting portions from said second portion ends with said wheel journalling ends being disposed horizontally and generally parallel each other, and support wheels journalled from the wheel journalling ends of said axle assemblies.

2. The undercarriage of claim 1, wherein said mount portions define horizontally outwardly opening socket portions, said mounting ends of said axle assemblies each defining a horizontal male member releasably securable within the corresponding socket portion.

3. The undercarriage of claim 2, wherein said socket portions include aligned opposite side horizontal transverse bores and each of said male members include a horizontal transverse bore registrable with the corresponding socket portion bores, and an anchor pin releasably passed through each set of corresponding male member bores and socket poriton bores.

4. The undercarriage of claim 1, including an elongated tow bar defining front and rear ends, said rear end of said tow bar and said other head end including means releasably mounting said tow bar on said other head end with the forward end of said tow bar projecting outwardly of said other head end, said forward end including means for releasably coupling to a towing vehicle.

5. The undercarriage of claim 4, including a jack assembly supported from said tow bar intermediate the opposite ends thereof and operable to define an adjustable length supporting leg for said tow bar.

* * * * *